(12) United States Patent
Murai

(10) Patent No.: US 11,677,294 B2
(45) Date of Patent: *Jun. 13, 2023

(54) POWER UNIT STRUCTURE FOR VEHICLE

(71) Applicant: Toyota Jidosha Kabushiki Kaisha, Toyota (JP)

(72) Inventor: Daisuke Murai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

This patent is subject to a terminal disclaimer.

(21) Appl. No.: 17/197,629

(22) Filed: Mar. 10, 2021

(65) Prior Publication Data
US 2021/0194318 A1 Jun. 24, 2021

Related U.S. Application Data

(63) Continuation of application No. 16/518,475, filed on Jul. 22, 2019, now Pat. No. 11,095,190.

(30) Foreign Application Priority Data

Aug. 28, 2018 (JP) .............................. JP2018-159625

(51) Int. Cl.
*H02K 7/00* (2006.01)
*B60L 1/02* (2006.01)
(Continued)

(52) U.S. Cl.
CPC ............... *H02K 7/006* (2013.01); *B60L 1/02* (2013.01); *B62D 21/09* (2013.01); *B62D 25/02* (2013.01); *B62D 27/02* (2013.01); *H02K 47/04* (2013.01)

(58) Field of Classification Search
CPC ........ H02K 7/006; H02K 47/04; B60L 53/22; B60L 15/007; B60L 1/02; B62D 21/09;
(Continued)

(56) References Cited

U.S. PATENT DOCUMENTS 11,095,190 B2 * 8/2021 Murai ................... B62D 25/02
2009/0057041 A1 3/2009 Kamaga
(Continued)

FOREIGN PATENT DOCUMENTS

CN 102458892 A 5/2012
CN 104395120 A 3/2015
(Continued)

OTHER PUBLICATIONS

Notice of Allowance dated Apr. 21, 2021 in U.S. Appl. No. 16/518,475.

*Primary Examiner* — Alex W Mok
(74) *Attorney, Agent, or Firm* — Dinsmore & Shohl LLP

(57) ABSTRACT

A power unit structure for a vehicle includes a motor disposed in a power unit room of the vehicle and configured to transmit a driving force to drive wheels of the vehicle, an electric power converter disposed in the power unit room of the vehicle, and an electric power distributor disposed in the power unit room of the vehicle. The electric power converter is configured to convert supplied electric power into electric power to be supplied to the motor and is disposed on an upper side of the motor. The electric power distributor is configured to distribute electric power supplied from a power supply to the electric power converter and is disposed at a position where at least a part of the electric power distributor overlaps the electric power converter in an up-down direction of the vehicle when viewed from a vehicle front-rear direction or a vehicle width direction.

7 Claims, 11 Drawing Sheets

(51) Int. Cl.
*B62D 21/09* (2006.01)
*B62D 25/02* (2006.01)
*B62D 27/02* (2006.01)
*H02K 47/04* (2006.01)

(58) Field of Classification Search
CPC .......... B62D 27/02; B62D 25/02; B60K 1/00; B60K 2001/001; Y02T 10/7072; Y02T 10/64; Y02T 90/14; Y02T 10/70
USPC ...................................................... 310/68 R
See application file for complete search history.

(56) References Cited

U.S. PATENT DOCUMENTS

| | | |
|---|---|---|
| 2010/0024382 A1 | 2/2010 | Zhang et al. |
| 2010/0025127 A1 | 2/2010 | Oyobe |
| 2010/0038156 A1 | 2/2010 | Fujitake et al. |
| 2012/0055724 A1 | 3/2012 | Iwasa et al. |
| 2012/0186253 A1 | 7/2012 | Campbell |
| 2013/0126252 A1 | 5/2013 | Suzuki |
| 2015/0107920 A1 | 4/2015 | Sakamoto |
| 2015/0122561 A1 | 5/2015 | Kashiwai et al. |
| 2015/0251531 A1 | 9/2015 | Hotta et al. |
| 2015/0274013 A1 | 10/2015 | Matsuda et al. |
| 2016/0229293 A1 | 8/2016 | Seo et al. |
| 2017/0291482 A1 | 10/2017 | Pearce, Jr. et al. |
| 2017/0291643 A1 | 10/2017 | Sakamoto |
| 2017/0355272 A1 | 12/2017 | Baba et al. |
| 2018/0029459 A1 | 2/2018 | Okada et al. |
| 2018/0056901 A1 | 3/2018 | Ando et al. |

FOREIGN PATENT DOCUMENTS

| | | |
|---|---|---|
| JP | H09-277840 A | 10/1997 |
| JP | 2009-065728 A | 3/2009 |
| JP | 2011-006050 A | 1/2011 |
| JP | 2011-020622 A | 2/2011 |
| JP | 2011-020628 A | 2/2011 |
| JP | 2012-153229 A | 8/2012 |
| JP | 5211081 B2 | 6/2013 |
| JP | 2013-230731 A | 11/2013 |
| JP | 2015-074435 A | 4/2015 |
| JP | 2015-089806 A | 5/2015 |
| JP | 2015-137010 A | 7/2015 |
| KR | 1020170140772 A | 12/2017 |
| WO | 2010/119320 A1 | 10/2010 |
| WO | 2010119321 A1 | 10/2010 |
| WO | 2010-133934 A1 | 11/2010 |
| WO | 2013/168227 A1 | 11/2013 |

* cited by examiner

POWER UNIT STRUCTURE FOR VEHICLE

CROSS-REFERENCE TO RELATED APPLICATIONS

This application is a continuation application of U.S. patent application Ser. No. 16/518,475 filed Jul. 22, 2019, which claims priority to Japanese Patent Application No. 2018-159625 filed on Aug. 28, 2018, which is incorporated herein by reference in its entirety including the specification, drawings and abstract.

BACKGROUND

1. Technical Field

The present disclosure relates to a power unit structure for a vehicle.

2. Description of Related Art

Japanese Unexamined Patent Application Publication No. 2011-020628 (JP 2011-020628 A) discloses a motor room structure. In this motor room structure, an inverter (an electric power conversion unit) for converting electric power from a power supply and supplying it to a motor is disposed on the upper side of the motor in an up-down direction of the vehicle.

On the other hand, in a strong electricity box structure of an electric vehicle described in Japanese Unexamined Patent Application Publication No. 09-277840 (JP 09-277840 A), a junction box (an electric power distribution unit) is disposed on the upper side of an inverter in an up-down direction of the vehicle.

SUMMARY

Incidentally, when a configuration in which the related art described in JP 09-277840 A is applied to the related art described in JP 2011-020628 A is adopted in disposition of the motor, the inverter, and the junction box, the motor, the inverter, and the junction box are all disposed to be arranged in a row in an up-down direction of the vehicle.

However, when the motor, the inverter, and the junction box are all disposed to be arranged in a row in the up-down direction of the vehicle, it is conceivable that a power unit room in which these are accommodated becomes large in the up-down direction of the vehicle.

The present disclosure provides a power unit structure for a vehicle, in which, even though a motor, an electric power conversion unit, and an electric power distribution unit are disposed in a power unit room, it is possible to suppress the power unit room from becoming large in the up-down direction of the vehicle.

An aspect of the present disclosure relates to a power unit structure for a vehicle. The power unit structure includes a motor disposed in a power unit room of the vehicle and configured to transmit a driving force to drive wheels of the vehicle, an electric power converter disposed in the power unit room of the vehicle, and an electric power distributor disposed in the power unit room of the vehicle. The electric power converter is configured to convert supplied electric power into electric power to be supplied to the motor and is disposed on an upper side of the motor. The electric power distributor is configured to distribute electric power supplied from a power supply to the electric power converter and is disposed at a position where at least a part of the electric power distributor overlaps the electric power converter in an up-down direction of the vehicle when viewed from a front-rear direction of the vehicle or a vehicle width direction of the vehicle.

According to the aspect of the present disclosure, the electric power supplied from the power supply is distributed to the electric power converter by the electric power distributor. Further, the electric power supplied from the electric power distributor to the electric power converter is converted in the electric power converter so as to be supplied to the motor disposed in the power unit room. Then, the motor supplied with the electric power from the electric power converter is driven, and the driving force is transmitted to the drive wheels to drive the drive wheels.

Incidentally, when the motor, the electric power converter, and the electric power distributor are all disposed to be arranged in a row in the up-down direction of the vehicle, it is conceivable that a space needed for accommodating them becomes large in the up-down direction of the vehicle.

Here, in the aspect of the present disclosure, the electric power converter is disposed on the upper side of the motor and the electric power distributor is disposed at a position overlapping the electric power converter when viewed from the front-rear direction of the vehicle or the vehicle width direction of the vehicle. For this reason, compared to a configuration in which the motor, the electric power converter, and the electric power distributor are all disposed to be arranged in a row in the up-down direction of the vehicle, the space needed for accommodating the motor, the electric power converter, and the electric power distributor can be suppressed from becoming large in the up-down direction of the vehicle, by an amount corresponding to the overlap of the electric power distributor and the electric power converter.

In the power unit structure according to the aspect of the present disclosure, the electric power distributor may be disposed at a position where at least a part of the electric power distributor overlaps the electric power converter when viewed from the vehicle width direction of the vehicle.

According to the aspect of the present disclosure, since the electric power distributor is disposed at a position where at least a part of the electric power distributor overlaps the electric power converter when viewed from the vehicle width direction of the vehicle, the space needed for accommodating the motor, the electric power converter, and the electric power distributor can be suppressed from becoming large in the front-rear direction of the vehicle, by an amount corresponding to the overlap of the electric power distributor and the electric power converter.

In the power unit structure according to the aspect of the present disclosure, the electric power distributor may be mounted on a mounting part provided on a vehicle body constituent member of the vehicle. The vehicle body constituent member may configure a part of a side portion in the vehicle width direction of the vehicle.

According to the aspect of the present disclosure, the electric power distributor is supported by the vehicle body constituent member configuring a part of a side portion in the width direction of the vehicle through the mounting part.

In the power unit structure according to the aspect of the present disclosure, the vehicle body constituent member may be a pair of suspension towers of the vehicle. The mounting part may be laid in the vehicle width direction of the vehicle between the suspension towers.

According to the aspect of the present disclosure, the mounting part is laid in the vehicle width direction of the vehicle between the suspension towers, and these suspension towers are connected to each other in the vehicle width direction of the vehicle by the mounting part. For this reason, relative displacement in the vehicle width direction of the vehicle between the suspension towers is suppressed during traveling or the like of the vehicle, and as a result, the twist of the vehicle body is suppressed.

In the power unit structure according to the aspect of the present disclosure, the vehicle body constituent member may be a pair of front side members of the vehicle. The mounting part may be laid in the vehicle width direction of the vehicle between the front side members.

According to the aspect of the present disclosure, the mounting part is laid in the vehicle width direction of the vehicle between the front side members. For this reason, when the front side member is crushed and deformed due to a collision load from the front side of the vehicle, the relative displacement in the vehicle width direction of the vehicle between the front side members is suppressed by the mounting part. As a result, when the front side member is crushed and deformed, it is possible to suppress the front side member from being bent and deformed in the vehicle width direction of the vehicle.

In the power unit structure according to the aspect of the present disclosure, each of the front side members may include a shaft part that protrudes to an inner side in the vehicle width direction of the vehicle and is used for mounting of the mounting part. The mounting part may include an insertion portion configured such that the shaft part is inserted into the insertion portion in an axial direction of the shaft part, and a fuse portion that is provided adjacent to the insertion portion and permits relative displacement in the front-rear direction of the vehicle between the shaft part and the insertion portion by being plastically deformed when a load having a magnitude equal to or larger than a predetermined value, toward a front side of the vehicle, acts on the mounting part.

According to the aspect of the present disclosure, each of the front side members is provided with the shaft part protruding to the inner side in the vehicle width direction of the vehicle, and the mounting part to which the electric power distributor is mounted is mounted to the shaft part.

Incidentally, when the front side member is crushed and deformed due to the collision load from the front side of the vehicle, it is conceivable that the front side member is not easily crushed and deformed at the mounting place of the mounting part in the front side member.

Here, in the aspect of the present disclosure, the insertion portion is provided in the mounting part, and the shaft part provided at the front side member is inserted into the insertion portion. Further, the mounting part has the fuse portion provided adjacent to the insertion portion. Then, when a load which is equal to or larger than a predetermined value, toward the front side of the vehicle, acts on the mounting part, the fuse portion is plastically deformed, so that the relative displacement in the front-rear direction of the vehicle between the shaft part and the insertion portion is permitted, and eventually, the relative displacement between the front side member and the mounting part is permitted.

For this reason, when the front side member is crushed and deformed due to the collision load from the front side of the vehicle, even though the crushed deformation reaches the place where the shaft part is provided, the mounting part is displaced toward the rear side of the vehicle, and thus it is possible to suppress the mounting part from serving as resistance to the crushed deformation.

In the power unit structure according to the aspect of the present disclosure, a connection portion for charging, to which electric power is supplied from an external power supply as the power supply, may be disposed at a fender portion configuring a part on a design surface side of the side portion in the vehicle width direction of the vehicle. The electric power distributor may be disposed at a position closer to the connection portion than the electric power converter, and the connection portion and the electric power distributor may be connected to each other by a wire harness.

According to the aspect of the present disclosure, the connection portion for charging to which electric power is supplied from the external power supply is disposed at the fender portion configuring a part on the design surface side of the side portion in the vehicle width direction of the vehicle. Further, the connection portion and the electric power distributor are connected to each other by the wire harness. Here, in the aspect of the present disclosure, the electric power distributor is disposed at a position closer to the connection portion than the electric power converter, and thus the wire harness can be shortened compared to a configuration in which the electric power distributor and the electric power converter are disposed to be arranged in a row in the up-down direction of the vehicle.

In the power unit structure according to the aspect of the present disclosure, the electric power converter may be fixed to the motor.

According to the aspect of the present disclosure, the electric power converter is fixed to the motor, and the electric power converter and the motor can be mounted to the vehicle body in a state of being subassembled.

In the power unit structure according to the aspect of the present disclosure, the motor may include a motor side connector that is disposed on the upper side of the motor, and the electric power converter may include an electric power converter side connector that is disposed on the lower side of the electric power converter and configured to be electrically connected to the motor side connector.

According to the aspect of the present disclosure, when the electric power converter is fixed to the motor, the motor side connector on the upper side of the motor and the electric power converter side connector on the lower side of the electric power converter are coupled to each other, whereby the motor and the electric power converter can be electrically connected to each other.

In the power unit structure according to the aspect of the present disclosure, the electric power converter and the electric power distributor may be electrically connected to each other by a power unit side wire harness.

According to the aspect of the present disclosure, since the electric power converter and the electric power distributor are electrically connected to each other by the power unit side wire harness, even though a vibration mode of the electric power converter and a vibration mode of the electric power distributor are different from each other, it is possible to maintain the electrical connection state between the electric power converter and the electric power distributor in a stable state.

The power unit structure according to the aspect of the present disclosure may further include a water heating heater disposed on the upper side of the electric power converter. The water heating heater may be configured to receive electric power that is supplied from the electric power distributor. The water heating heater may be disposed at a position overlapping the electric power distributor when viewed from the vehicle width direction of the vehicle.

According to the aspect of the present disclosure, electric power is supplied to the water heating heater to drive the water heating heater, whereby it is possible to warm air that is blown to the inside of a vehicle cabin. Further, in the aspect of the present disclosure, the water heating heater is disposed at a position overlapping the electric power distributor when viewed from the vehicle width direction of the vehicle. In this way, compared to such a configuration that the water heating heater is disposed on the upper side of the electric power distributor, it is possible to suppress the space needed for accommodating the motor, the electric power converter, the electric power distributor, and the water heating heater from becoming large in the up-down direction of the vehicle.

As described above, the power unit structure according to the aspect of the present disclosure has an effect that, even though the motor, the electric power converter, and the electric power distributor are disposed in the power unit room, it is possible to suppress the power unit room from becoming large in the up-down direction of the vehicle.

Further, the power unit structure according to the aspect of the present disclosure has an effect that, even though the motor, the electric power converter, and the electric power distributor are disposed in the power unit room, it is possible to suppress the power unit room from becoming large in the front-rear direction of the vehicle.

Further, the power unit structure according to the aspect of the present disclosure has an effect that it is possible to support the electric power distributor in a stable state.

Further, the power unit structure according to the aspect of the present disclosure has an effect that it is possible to reduce the influence of the deformation of the vehicle body on the electric power distributor during traveling or the like of the vehicle.

Further, the power unit structure according to the aspect of the present disclosure has an effect that it is possible to secure the shock absorbing performance of the front side member while supporting the electric power distributor in a stable state.

Further, the power unit structure according to the aspect of the present disclosure has an effect that it is possible to secure a crushing margin against the collision load from the front side of the vehicle of the front side member while supporting the electric power distributor in a stable state.

Further, the power unit structure according to the aspect of the present disclosure has an effect that it is possible to reduce an electric power loss occurring when electric power is supplied from the connection portion for charging of the external power supply to the electric power distributor, while suppressing the power unit room from becoming large in the up-down direction of the vehicle.

Further, the power unit structure according to the aspect of the present disclosure has an effect that it is possible to reduce the number of processes when disposing the motor and the electric power converter in the power unit room, while suppressing the power unit room from becoming large in the up-down direction of the vehicle.

Further, the power unit structure according to the aspect of the present disclosure has an effect that it is possible to reduce the number of processes of work of assembling the motor and the electric power converter.

Further, the power unit structure according to the aspect of the present disclosure has an effect that it is possible to stably supply electric power from the electric power distributor to the electric power converter.

Further, the power unit structure according to the aspect of the present disclosure has an effect that, even though in addition to the motor, the electric power converter, and the electric power distributor, the water heating heater is disposed in the power unit room, it is possible to suppress the power unit room from becoming large in the up-down direction of the vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

First Embodiment

Hereinafter, a first embodiment of a power unit structure for a vehicle will be described using FIGS. 1 to 7. An arrow FR appropriately shown in each drawing indicates the front side of the vehicle, an arrow UP indicates the upper side of the vehicle, and an arrow RH indicates the right side in a vehicle width direction of the vehicle.

Figure 7:
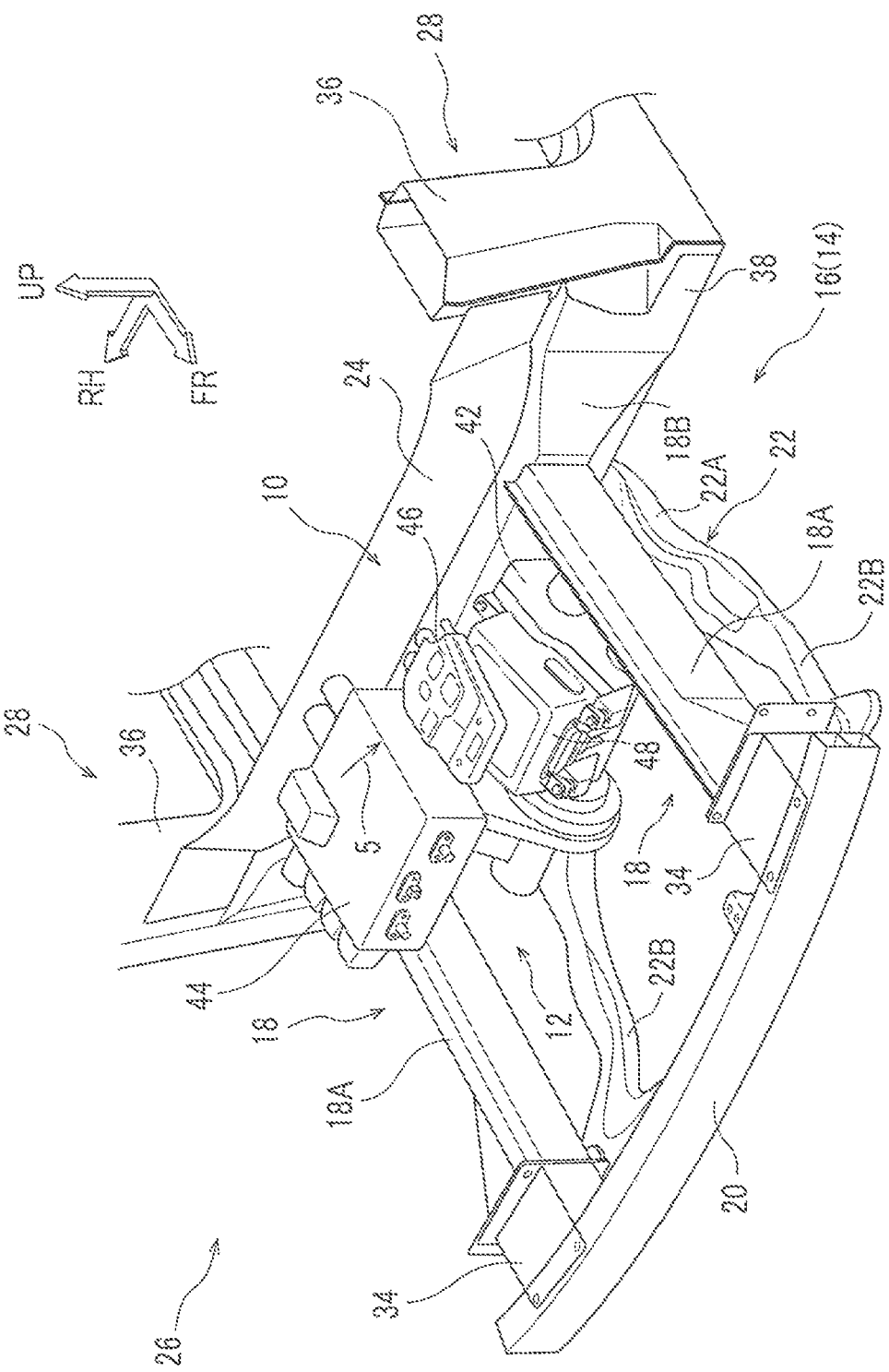
FIG. 7 is a perspective view showing the configurations of the power unit to which the power unit structure for a vehicle according to the first embodiment is applied and the vehicle body front portion, as viewed from outside forward of the vehicle.

First, the configuration of a vehicle body front portion 16 configuring a portion on the front side of the vehicle of a vehicle body 14 having a "power unit room 12" in which a power unit 10 to which the power unit structure for a vehicle according to this embodiment is applied is disposed will be described using FIG. 7.

The vehicle body front portion 16 includes a pair of "front side members 18", a bumper reinforcement 20 (hereinafter referred to as a "bumper RIF 20"), a suspension member 22, and a dash panel 24, as vehicle body constituent members.

The front side member 18 configures a part of a "side portion 28 in the vehicle width direction of the vehicle" in a "vehicle 26" and is disposed on the outer side in the vehicle width direction of the vehicle of the power unit room 12. The front side member 18 is configured to include a front portion 18A extending in a front-rear direction of the vehicle, and a kick portion 18B extending to be inclined on a downhill slope from the portion on the rear side of the vehicle of the front portion 18A toward the rear side of the vehicle.

Figure 1:
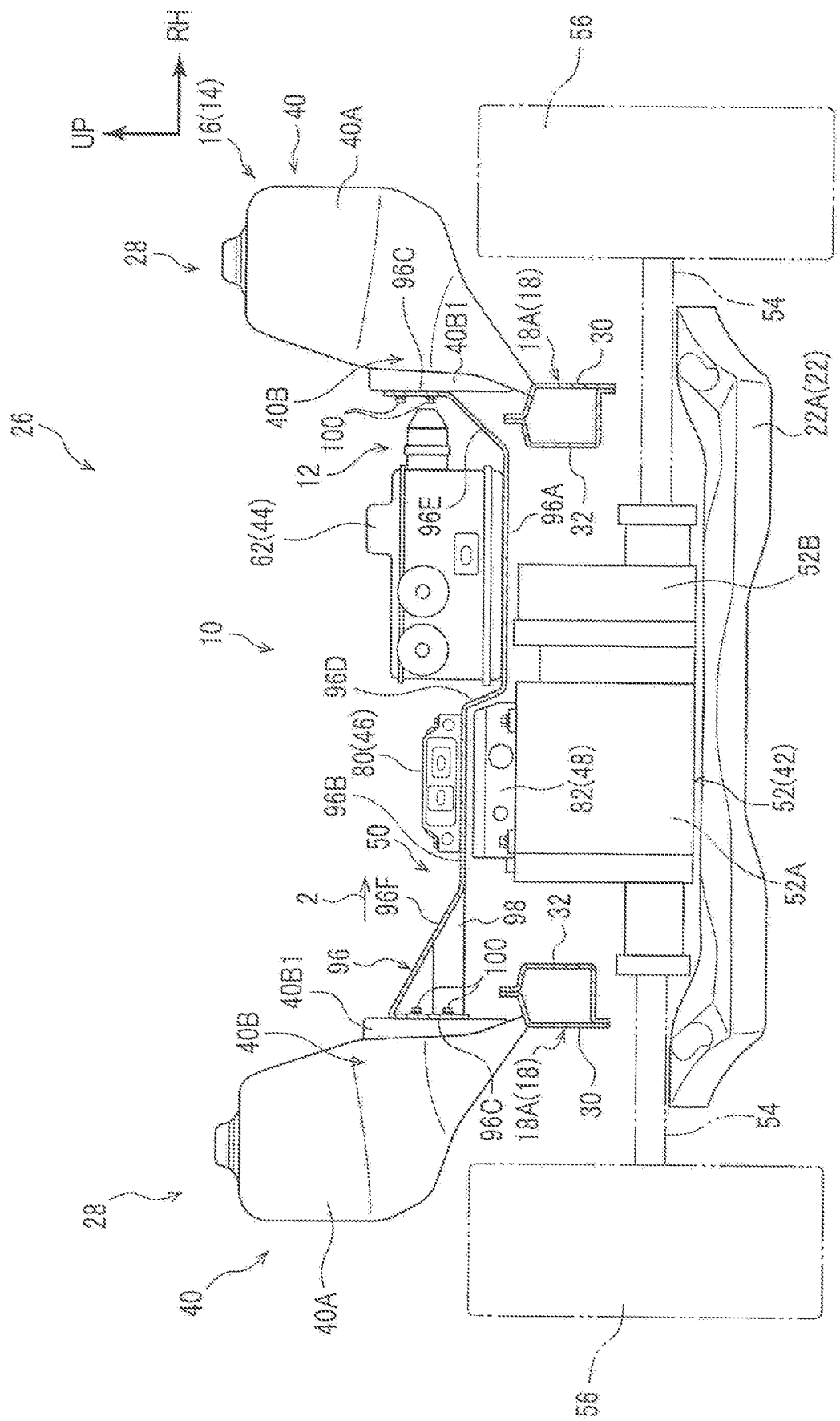
FIG. 1 is a rear view showing the configurations of a power unit to which a power unit structure for a vehicle according to a first embodiment is applied and a vehicle body front portion, as viewed from the rear side of a vehicle.

More specifically, as shown in FIG. 1, the front portion 18A is configured to include a front portion outer portion 30 configuring a portion on the outer side in the vehicle width direction of the vehicle of the front portion 18A, and a front portion inner portion 32 configuring a portion on the inner side in the vehicle width direction of the vehicle of the front portion 18A, and has a closed cross-sectional structure in which a cross-sectional shape when viewed from the front-rear direction of the vehicle is a substantially rectangular frame shape.

The bumper R/F 20 is disposed on the front side of the vehicle of the front side member 18 with a longitudinal direction thereof being in the vehicle width direction of the vehicle, and is made of an extruded material of an aluminum alloy in which a cross-sectional shape when viewed from the longitudinal direction thereof is a rectangular frame shape divided into two parts in the up-down direction of the vehicle. Each of both end portions of the bumper R/F 20 is connected to an end portion on the front side of the vehicle of each of the front side members 18 through a crush box 34, and the bumper R/F 20 is in a state of being laid in the vehicle width direction of the vehicle between the front side members 18.

The suspension member 22 is configured to include a suspension member main body portion 22A configuring the main portion thereof and a pair of extending portions 22B. The suspension member main body portion 22A is formed in a substantially rectangular shape when viewed from the up-down direction of the vehicle, and a portion on the rear side of the vehicle of the suspension member main body portion 22A is mounted to a portion on the rear side of the vehicle in the front portion 18A of the front side member 18 by a mounting member (not shown).

Further, a suspension arm (not shown) is mounted to each of the portions on the outer side in the vehicle width direction of the vehicle of the suspension member main body portion 22A. An end portion on the lower side of the vehicle of a shock absorber (not shown) is connected to a tip portion of the suspension arm.

The extending portion 22B extends from the portion on the front side of the vehicle of the suspension member main body portion 22A toward the front side of the vehicle, and a portion on the tip side thereof is mounted to the portion on the front side of the vehicle in the front portion 18A of the front side member 18 by a mounting member (not shown).

On the other hand, a front pillar 36 extending in the up-down direction of the vehicle is disposed on the outer side in the vehicle width direction of the vehicle of the front side member 18. The front pillar 36 is connected to the kick portion 18B of the front side member 18 through a torque box portion 38 on the lower side of the vehicle of the front pillar 36. Then, the dash panel 24 is disposed on the rear side of the vehicle of the front side member 18 and between the front side members 18.

The dash panel 24 is a press molded member extending in the vehicle width direction of the vehicle and the up-down direction of the vehicle and is disposed with a plate thickness direction being in the front-rear direction of the vehicle. The end portion on the outer side in the vehicle width direction of the vehicle of the dash panel 24 is joined to the front pillar 36 by a joining portion (not shown) by welding or the like, and the surface on the front side of the vehicle of the dash panel 24 is joined to the kick portion 18B of the front side member 18 by a joining portion (not shown) by welding or the like.

In this embodiment, the power unit room 12 can be regarded as a space partitioned by the bumper R/F 20, the front side members 18, and the dash panel 24 when viewed from the up-down direction of the vehicle.

On the other hand, as shown in FIG. 1, a "suspension tower 40" as a vehicle body constituent member configuring a part of the side portion 28 in the vehicle width direction of the vehicle is disposed on the outer side in the vehicle width direction of the vehicle of each of the front side members 18.

The suspension tower 40 is made of a press molded member configured to include a suspension tower main body portion 40A and a vertical wall portion 40B. The suspension tower main body portion 40A configures the main portion of the suspension tower 40, is opened on the lower side of the vehicle of the suspension tower main body portion 40A, and is formed in a box shape or a tubular shape in which the shock absorber described above and a part of a spring (not shown) mounted to the shock absorber can be accommodated in the interior thereof. The end portion on the upper side of the vehicle of the shock absorber is connected to the portion of the upper side of the vehicle of the suspension tower main body portion 40A.

The vertical wall portion 40B extends from the portion on the inner side in the vehicle width direction of the vehicle of the suspension tower main body portion 40A toward the lower side of the vehicle, and the end portion on the lower side of the vehicle of the vertical wall portion 40B is joined to the portion on the upper side of the vehicle in the front portion 18A of the front side member 18 by a joining portion (not shown) by welding (not shown) or the like.

Figure 2:
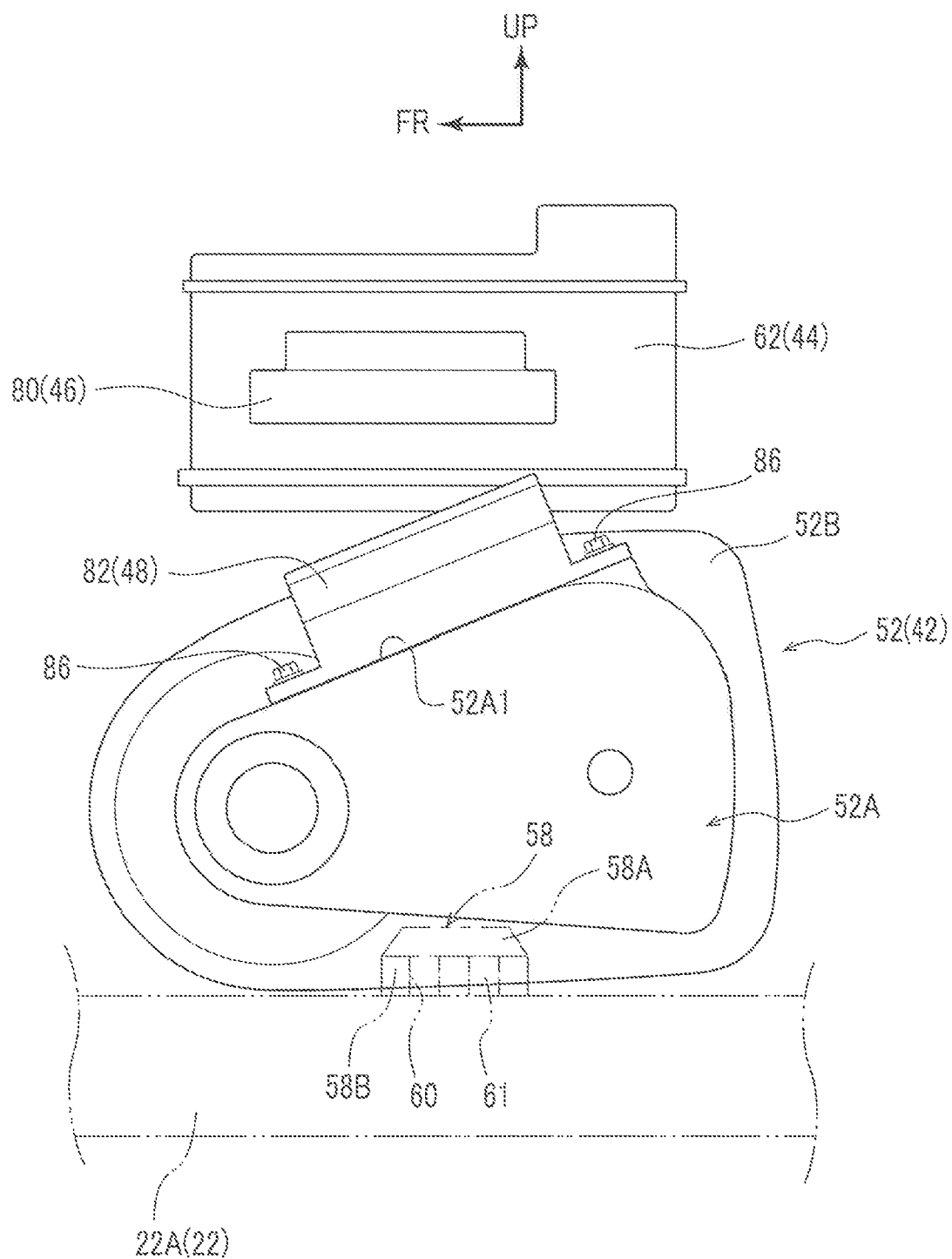
FIG. 2 is a side view (a view as viewed from the direction of an arrow 2 in FIG. 1) showing the configuration of the power unit to which the power unit structure for a vehicle according to the first embodiment is applied, as viewed from the outer side in a vehicle width direction of the vehicle.

Here, in this embodiment, as shown in FIGS. 1 and 2, there is a first feature in the disposition of a "motor 42", an "electric power distribution unit 44", a "water heating heater 46", and a "DC/AC inverter 48 (hereinafter referred to as an inverter 48)" as an electric power conversion unit, which configure the power unit 10. Further, there is a second feature in the configuration of a "mounting part 50" to which the electric power distribution unit 44 and the water heating heater 46 are mounted. Hereinafter, the configurations of the power unit 10 and the mounting part 50 configuring the main part of this embodiment will be described in detail.

The motor 42 is provided with a housing 52 configuring an outer shell thereof, and a motor main body portion, a counter gear mechanism, and a differential gear mechanism, which are not shown, are disposed inside the housing 52. The motor main body portion is driven by electric power that is supplied thereto, and the driving force of the motor main body portion is transmitted to a pair of drive shafts 54 through the counter gear mechanism and the differential gear mechanism to drive "drive wheels 56 (front wheels)".

Further, the housing 52 is configured to include a first accommodation portion 52A configuring a portion on the left side in the vehicle width direction of the vehicle of the housing 52 and a second accommodation portion 52B configuring a portion on the right side in the vehicle width direction of the vehicle of the housing 52. The motor main body portion and a main portion of the differential gear mechanism are accommodated in the first accommodation portion 52A, and a main portion of the counter gear mechanism is accommodated in the second accommodation portion 52B.

A mount bracket 58 is provided at each of both sides in the vehicle width direction of the vehicle of the housing 52. The mount bracket 58 is configured to include a mounting part 58A mounted to the housing 52 by a mounting member (not shown), and a support portion 58B supported on the suspension member main body portion 22A. Further, a through portion 60 penetrating in the up-down direction of the vehicle is formed in the support portion 58B, and a bush 61 made of an elastic body such as rubber is mounted in the through portion 60. The mount bracket 58 is mounted to the suspension member main body portion 22A through the bush 61, whereby a state where the motor 42 is supported on the suspension member 22 is created.

On the other hand, the electric power distribution unit 44 is disposed on the upper side of the vehicle of the second accommodation portion 52B of the motor 42, the inverter 48 is disposed on the upper side of the vehicle of the first accommodation portion 52A of the motor 42, and the water heating heater 46 is disposed on the upper side of the vehicle of the inverter 48.

Figure 3:
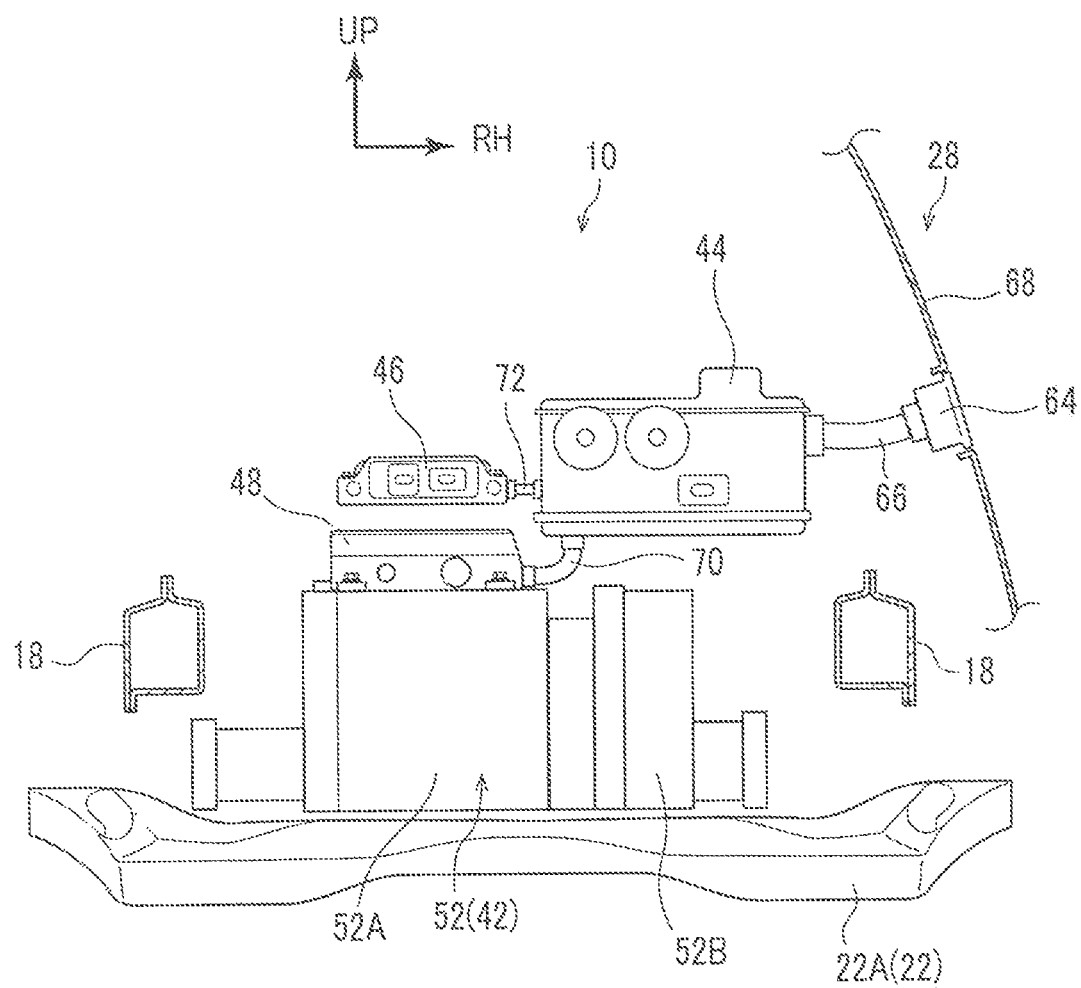
FIG. 3 is a rear view showing an electrical connection state of each constituent element in the power unit to which the power unit structure for a vehicle according to the first embodiment is applied, as viewed from the rear side of the vehicle.
Figure 4:
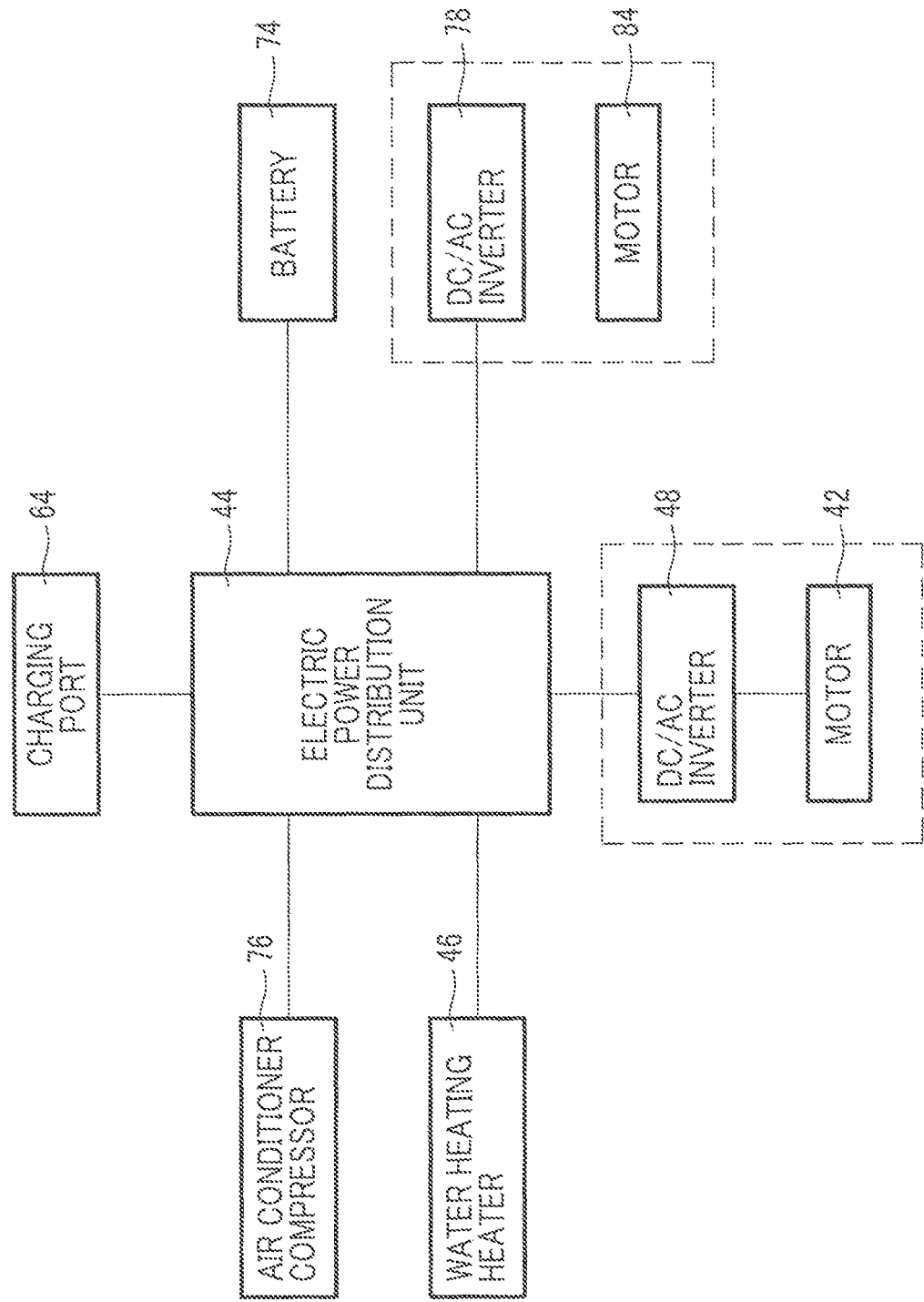
FIG. 4 is a block diagram showing an electrical connection state of the power unit to which the power unit structure for a vehicle according to a first embodiment is applied, and each constituent element disposed around the power unit.

Specifically, the electric power distribution unit 44 includes a housing 62 formed in a box shape having a substantially rectangular parallelepiped outer shape, and a plurality of electronic devices (not shown), that is, a high voltage junction box, a DC charging relay, an AC charger, and a DC/DC inverter, built in the housing 62. The electric power distribution unit 44 is electrically connected to a "charging port 64" as a connection portion through a "wire harness 66" as a side portion side wire harness, as shown in FIGS. 3 and 4.

Further, in this embodiment, as an example, the charging port 64 is provided in a "fender portion 68" configuring a part on the design surface side in the side portion 28 in the vehicle width direction of the vehicle on the right side in the vehicle width direction of the vehicle. Then, the electric power distribution unit 44 is disposed further on the charging port 64 side than the inverter 48, that is, on the right side in the vehicle width direction of the vehicle.

Further, the electric power distribution unit 44 is electrically connected to the inverter 48 through a "wire harness 70" as a power unit side wire harness and to the water heating heater 46 through a wire harness 72. Further, the electric power distribution unit 44 is made so as to supply (distribute) electric power supplied from an external power supply such as a charging station (not shown) through the charging port 64 to a "main battery 74 (an internal power supply)" as a power supply. Then, the electric power stored in the main battery 74 can be distributed to the inverter 48 and the water heating heater 46 by the electric power distribution unit 44.

Further, the electric power distribution unit 44 can also distribute electric power to an air conditioner compressor 76 and a "DC/AC inverter 78 (hereinafter referred to as an inverter 78)" as an electric power conversion unit disposed on the rear side of the vehicle.

On the other hand, the water heating heater 46 is configured to include a housing 80 formed in a box shape having an outer shape smaller than that of the housing 62 and a plurality of electronic devices (not shown) built in the housing 80, and is made to be capable of warming air that is blown to the inside of a vehicle cabin.

Specifically, the water heating heater 46 is made to be capable of warming water (heating medium) flowing toward a heater core (not shown) through a pipe connected to the heater core by being driven by electric power that is supplied thereto. Then, air is blown from a blower (not shown) to the inside of the vehicle cabin via the heater core, whereby warm air can be sent into the vehicle cabin. Further, as shown in FIG. 2, the water heating heater 46 is disposed at a position overlapping the electric power distribution unit 44 when viewed from the vehicle width direction of the vehicle, more specifically, at a position where the outer periphery of the water heating heater 46 is entirely within the outer periphery of the electric power distribution unit 44.

The inverter 48 is configured to include a housing 82 formed in a box shape having an outer shape smaller than that of the housing 62 and larger than that of the housing 80, and a plurality of electronic devices (not shown) built in the housing 82, and is made to be capable of converting the supplied electric power so as to be capable of being supplied to the motor 42. Specifically, the inverter 48 is made to convert a direct current from the main battery 74 or the like into an alternating current and allow the alternating current to flow to the motor 42. The inverter 78 also has the same configuration as the inverter 48, and the inverter 78 is made to be capable of converting the supplied electric power so as to be capable of being supplied to a motor 84 capable of transmitting a driving force to drive wheels (rear wheels) (not shown) on the rear side of the vehicle.

Figure 5:
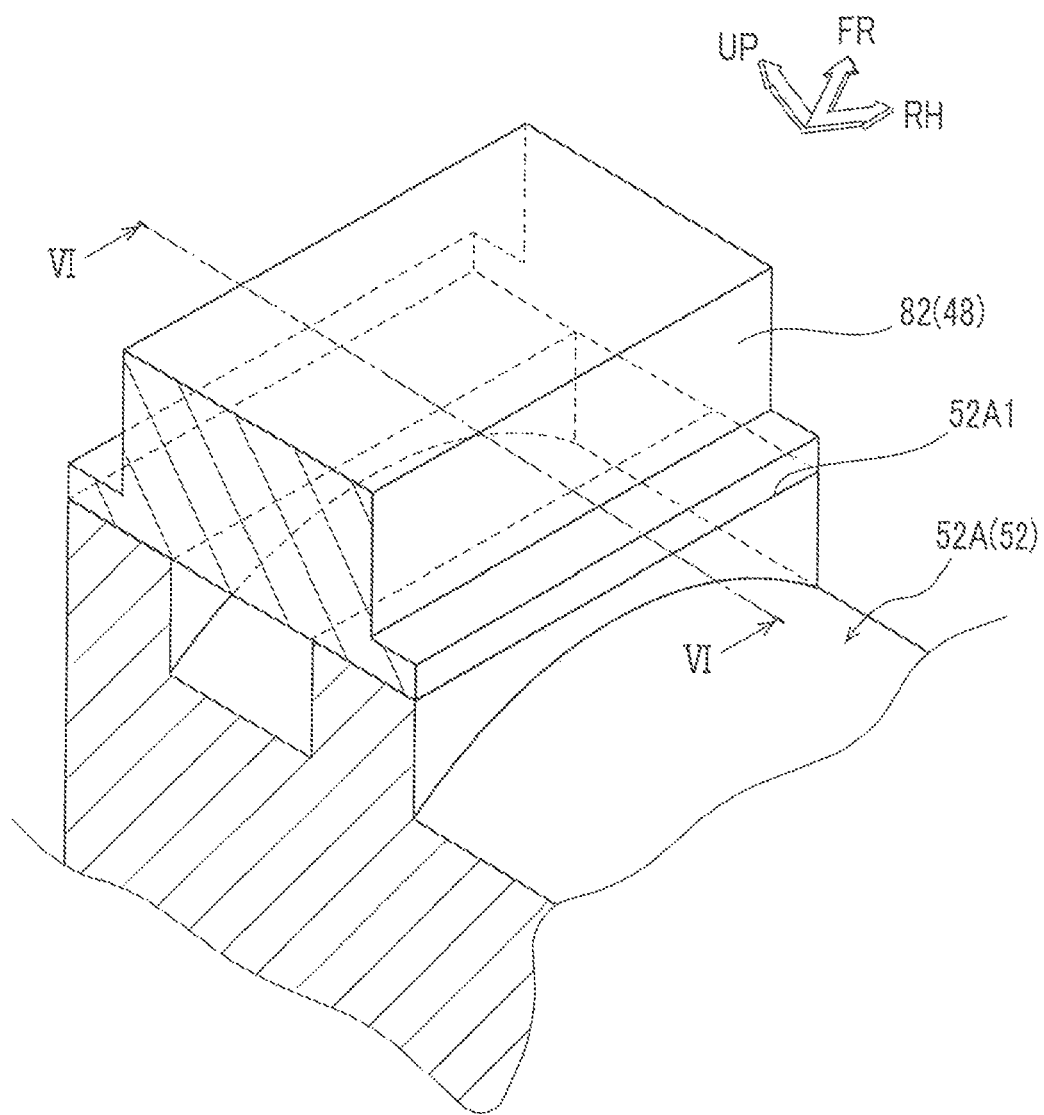
FIG. 5 is a perspective view (a view as viewed from the direction of an arrow 5 in FIG. 7) showing a relationship between a motor and an electric power conversion unit in the power unit to which the power unit structure for a vehicle according to the first embodiment is applied, as viewed from the outside rearward of the vehicle.

As also shown in FIG. 5, the inverter 48 is mounted on an upper wall portion 52A1 configuring a portion on the upper side of the vehicle of the first accommodation portion 52A of the housing 52. Specifically, the upper wall portion 52A1 is inclined on a downhill slope from the rear side of the vehicle toward the front side of the vehicle, the inverter 48 is disposed along the upper wall portion 52A1, and four corners of the housing 82 are fixed to the housing 52 with bolts 86 (fastening members) (refer to FIG. 6). In FIG. 5, for the sake of convenience, the interiors of the motor 42 and the inverter 48 are not shown in the cross-sections thereof.

The electric power distribution unit 44 described above is disposed at a position where the portion on the lower side of the vehicle of the electric power distribution unit 44 overlaps the portion on the upper side of the vehicle of the inverter 48 when viewed from the vehicle width direction of the vehicle. This can also be regarded as a part of the electric power distribution unit 44 being located at the same height as a part of the inverter 48 in the up-down direction of the vehicle.

Figure 6:
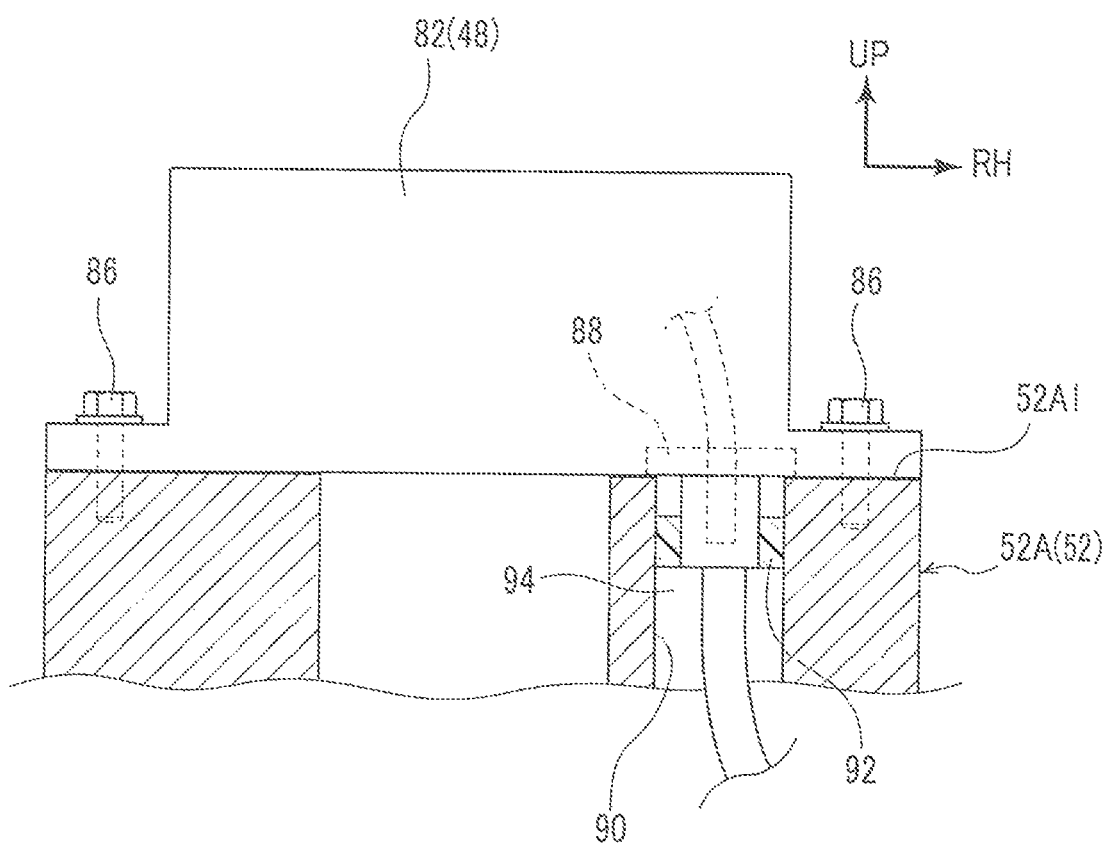
FIG. 6 is a partial sectional view (a sectional view showing a state cut along line VI-VI of FIG. 5) showing the relationship between the motor and the electric power conversion unit in the power unit to which the power unit structure for a vehicle according to the first embodiment is applied, as viewed from the outside rearward of the vehicle.

Further, as shown in FIG. 6, a "connector 88" of the inverter 48 as an electric power conversion unit side connector is provided on the lower side of the vehicle of the inverter 48, and the connector 88 is electrically connected to an electronic device in the housing 82 of the inverter 48. On the other hand, a recessed portion 90 is provided in the upper wall portion 52A1 of the housing 52 of the motor 42, and a "connector 94" of the motor 42 as a motor side connector is fixed to the inside of the recessed portion 90 through a spacer 92. The connector 94 is electrically connected to the electronic device in the housing 52 and is electrically connected to the connector 88 by being coupled to the connector 88.

Next, the configuration of the mounting part 50 will be described. As shown in FIG. 1, the mounting part 50 includes a main body portion 96 and a reinforcing plate portion 98. The main body portion 96 is formed by bending a metal plate material at a plurality of locations and is configured to include a placing portion 96A on which the electric power distribution unit 44 is placed, a placing portion 96B on which the water heating heater 46 is placed, and a pair of mounting piece portions 96C.

The placing portion 96A has a plate shape extending in the vehicle width direction of the vehicle and the front-rear direction of the vehicle with a plate thickness direction thereof being in the up-down direction of the vehicle, and a plurality of weld nuts (not shown) is provided on the surface on the lower side of the vehicle of the placing portion 96A. Then, fastening members such as bolts (not shown) inserted into the housing 62 from the upper side of the vehicle are fastened to the weld nuts of the placing portion 96A in a state where the electric power distribution unit 44 is placed on the placing portion 96A, whereby the electric power distribution unit 44 is fixed to the placing portion 96A.

On the other hand, the placing portion 96B has a plate shape extending in the vehicle width direction of the vehicle and the front-rear direction of the vehicle with a plate thickness direction thereof being in the up-down direction of the vehicle, and a plurality of weld nuts (not shown) is provided on the surface on the lower side of the vehicle of the placing portion 96B. Further, the placing portion 96B is disposed on the left side in the vehicle width direction of the vehicle and the upper side of the vehicle with respect to the placing portion 96A. Then, fastening members such as bolts (not shown) inserted into the housing 80 from the upper side of the vehicle are fastened to the weld nuts of the placing portion 96B in a state where the water heating heater 46 is placed on the placing portion 96B, whereby the water heating heater 46 is fixed to the placing portion 96B. A peripheral edge portion on the inner side in the vehicle width direction of the vehicle of the placing portion 96B is connected to a peripheral edge portion on the inner side in the vehicle width direction of the vehicle of the placing portion 96A by a connection portion 96D extending from the peripheral edge portion of the placing portion 96B toward the inner side in the vehicle width direction of the vehicle and the lower side of the vehicle. Further, the connection portion 96D is provided with an insertion portion (not shown) into which the wire harness 70 is inserted.

Each of the mounting piece portions 96C has a plate shape extending in the up-down direction of the vehicle and the front-rear direction of the vehicle with a plate thickness direction thereof being in the vehicle width direction of the vehicle, and a plurality of insertion portions (not shown) is formed in the mounting piece portion 96C. Further, a peripheral edge portion on the lower side of the vehicle of the mounting piece portion 96C on the right side in the vehicle width direction of the vehicle is connected to a peripheral edge portion on the outer side in the vehicle width direction of the vehicle of the placing portion 96A by a connection portion 96E extending from the peripheral edge portion on the lower side of the vehicle of the mounting piece portion 96C toward the inner side in the vehicle width direction of the vehicle and the lower side of the vehicle. On the other hand, a peripheral edge portion on the upper side of the vehicle of the mounting piece portion 96C on the left side in the vehicle width direction of the vehicle is connected to a peripheral edge portion on the outer side in the vehicle width direction of the vehicle of the placing portion 96B by a connection portion 96F extending from the peripheral edge portion on the upper side of the vehicle of the mounting piece portion 96C toward the inner side in the vehicle width direction of the vehicle and the lower side of the vehicle.

The reinforcing plate portion 98 is formed in a trapezoidal plate shape that is widened in width toward the lower side of the vehicle from the upper side of the vehicle when viewed from the front-rear direction of the vehicle. A peripheral edge portion on the inner side in the vehicle width direction of the vehicle of the reinforcing plate portion 98 is joined to the surface on the lower side of the vehicle of the connection portion 96F by a joining portion (not shown) by welding or the like, and a peripheral edge portion on the outer side in the vehicle width direction of the vehicle of the reinforcing plate portion 98 is joined to the surface on the inner side in the vehicle width direction of the vehicle of the mounting piece portion 96C on the left side in the vehicle width direction of the vehicle by a joining portion (not shown) by welding or the like.

On the other hand, the vertical wall portion 40B of the suspension tower 40 is provided with a mounting wall portion 40B1 integrally formed with the vertical wall portion 40B and extending in the up-down direction of the vehicle and the front-rear direction of the vehicle with a plate thickness direction thereof being in the vehicle width direction of the vehicle. Further, a weld nut (not shown) corresponding to the insertion portion of the mounting piece portion 96C is provided on the surface on the outer side in the vehicle width direction of the vehicle of the mounting wall portion 40B1. Then, a bolt 100 (a fastening member) is inserted into the insertion portion of the mounting piece portion 96C from the inner side in the vehicle width direction of the vehicle and fastened to the weld nut of the mounting wall portion 40B1, whereby the mounting part 50 is fixed to the suspension towers 40 in a state of being laid in the vehicle width direction of the vehicle between the suspension towers 40.

In a state where the mounting part 50 is mounted to the suspension towers 40, a predetermined gap is secured between the surface on the lower side of the vehicle of the mounting part 50, and the inverter 48 and the motor 42, and thus the mounting part 50 does not interfere with the inverter 48 and the motor 42 during traveling or the like of the vehicle 26.

Operation and Effect of This Embodiment

Next, the operation and effect of this embodiment will be described.

In this embodiment, as shown in FIGS. 3 and 4, the electric power supplied from an external power supply such as a charging station or an internal power supply such as the main battery 74 is distributed to the inverter 48 by the electric power distribution unit 44. Further, the electric power supplied from the electric power distribution unit 44 to the inverter 48 is converted by the inverter 48 so as to be capable of being supplied to the motor 42 disposed in the power unit room 12. Then, the motor 42 supplied with the electric power from the inverter 48 is driven, whereby the driving force is transmitted to the drive wheels 56, so that the drive wheels 56 are driven.

Incidentally, when the motor 42, the inverter 48, and the electric power distribution unit 44 are all disposed to be arranged in a row in the up-down direction of the vehicle, it is conceivable that a space needed for accommodating them becomes large in the up-down direction of the vehicle.

Here, in this embodiment, as shown in FIGS. 1 and 2, the inverter 48 is disposed on the upper side of the vehicle of the motor 42, and the electric power distribution unit 44 is disposed at a position overlapping the inverter 48 when viewed from the vehicle width direction of the vehicle. For this reason, compared to a configuration in which the motor 42, the inverter 48, and the electric power distribution unit 44 are all disposed to be arranged in a row in the up-down direction of the vehicle, the space needed for accommodating the motor 42, the inverter 48, and the electric power distribution unit 44 can be suppressed from becoming large in the up-down direction of the vehicle, by an amount corresponding to the overlap of the electric power distribution unit 44 and the inverter 48.

Therefore, in this embodiment, even though the motor 42, the inverter 48, and the electric power distribution unit 44 are disposed in the power unit room 12, it is possible to suppress the power unit room 12 from becoming large in the up-down direction of the vehicle. As a result, it is possible to suppress an increase in the height of the vehicle in the front portion of the vehicle 26, thereby contributing to improvement in the design of the vehicle 26.

Further, in this embodiment, the electric power distribution unit 44 is disposed at a position overlapping the inverter 48 when viewed from the vehicle width direction of the vehicle, and therefore, the space needed for accommodating the motor 42, the inverter 48, and the electric power distribution unit 44 can be suppressed from becoming large in the front-rear direction of the vehicle, by an amount corresponding to the overlap of the electric power distribution unit 44 and the inverter 48. As a result, even though the motor 42, the inverter 48, and the electric power distribution unit 44 are disposed in the power unit room 12, it is possible to suppress the power unit room 12 from becoming large in the front-rear direction of the vehicle.

Further, in this embodiment, the electric power distribution unit 44 is supported by the suspension tower 40 configuring a part of the side portion 28 in the vehicle width direction of the vehicle through the mounting part 50, and therefore, it is possible to support the electric power distribution unit 44 in a stable state.

Further, in this embodiment, the mounting part 50 is laid in the vehicle width direction of the vehicle between the suspension towers 40, and the suspension towers 40 are connected to each other in the vehicle width direction of the vehicle by the mounting part 50. For this reason, during traveling or the like of the vehicle 26, the relative displacement in the vehicle width direction of the vehicle between the suspension towers 40 is suppressed, and as a result, the twist of the vehicle body 14 is suppressed. That is, the mounting part 50 functions as a stabilizer of the vehicle body 14. Therefore, it is possible to reduce the influence of the deformation of the vehicle body 14 on the electric power distribution unit 44 during traveling or the like of the vehicle 26.

Further, in this embodiment, as shown in FIG. 3, the charging port 64 for charging to which electric power is supplied from an external power supply is provided in the fender portion 68 configuring a part of the design surface side of the side portion 28 in the vehicle width direction of the vehicle. Further, the charging port 64 and the electric power distribution unit 44 are electrically connected to each other by the wire harness 66. Here, in this embodiment, the electric power distribution unit 44 is disposed closer to the charging port 64 than the inverter 48, and thus it is possible to shorten the wire harness 66, compared to a configuration in which the electric power distribution unit 44 and the inverter 48 are disposed to be arranged in a row in the up-down direction of the vehicle. Therefore, it is possible to reduce an electric power loss occurring when electric power is supplied from the charging port 64 to the electric power distribution unit 44, while suppressing the power unit room 12 from becoming large in the up-down direction of the vehicle.

Further, in this embodiment, in a state where the inverter 48 is fixed to the motor 42 and the inverter 48 and the motor 42 are subassembled, these can be mounted to the vehicle body 14. As a result, it is possible to reduce the number of processes when disposing the motor 42 and the inverter 48 in the power unit room 12, while suppressing the power unit room 12 from becoming large in the up-down direction of the vehicle.

Further, in this embodiment, as shown in FIG. 6, when the inverter 48 is fixed to the motor 42, the connector 94 on the upper side of the vehicle of the motor 42 and the connector 88 on the lower side of the vehicle of the inverter 48 are coupled to each other, whereby the motor 42 and the inverter 48 can be electrically connected to each other. As a result, it is possible to reduce the number of processes of the work of assembling the motor 42 and the inverter 48.

Further, in this embodiment, as shown in FIG. 3, the inverter 48 and the electric power distribution unit 44 are electrically connected to each other by the wire harness 70.

Incidentally, since the inverter 48 is mounted on the motor 42 supported by the suspension member 22 and the electric power distribution unit 44 is fixed to the mounting part 50 fixed to the suspension towers 40, it is conceivable that a vibration mode is different between the inverter 48 and the electric power distribution unit 44 during traveling or the like of the vehicle 26. In this respect, in this embodiment, the inverter 48 and the electric power distribution unit 44 are electrically connected to each other by the wire harness 70, as described above, and therefore, even though the vibration mode of the inverter 48 and the vibration mode of the electric power distribution unit 44 are different from each other, it is possible to maintain the electrical connection state between the inverter 48 and the electric power distribution unit 44 in a stable state. As a result, it is possible to stably supply electric power from the electric power distribution unit 44 to the inverter 48.

In addition, in this embodiment, electric power is supplied to the water heating heater 46 to drive the water heating heater 46, whereby it is possible to warm air that is blown to the inside of the vehicle cabin. Further, in this embodiment, the water heating heater 46 is disposed at a position overlapping the electric power distribution unit 44 when viewed from the vehicle width direction of the vehicle. In this way, compared to such a configuration that the water heating heater 46 is disposed on the upper side of the vehicle of the electric power distribution unit 44, the space needed for accommodating the motor 42, the inverter 48, the electric power distribution unit 44, and the water heating heater 46 can be suppressed from becoming large in the up-down direction of the vehicle. As a result, even though in addition to the motor 42, the inverter 48, and the electric power distribution unit 44, the water heating heater 46 is disposed in the power unit room 12, it is possible to suppress the power unit room 12 from becoming large in the up-down direction of the vehicle.

Second Embodiment

Figure 8:
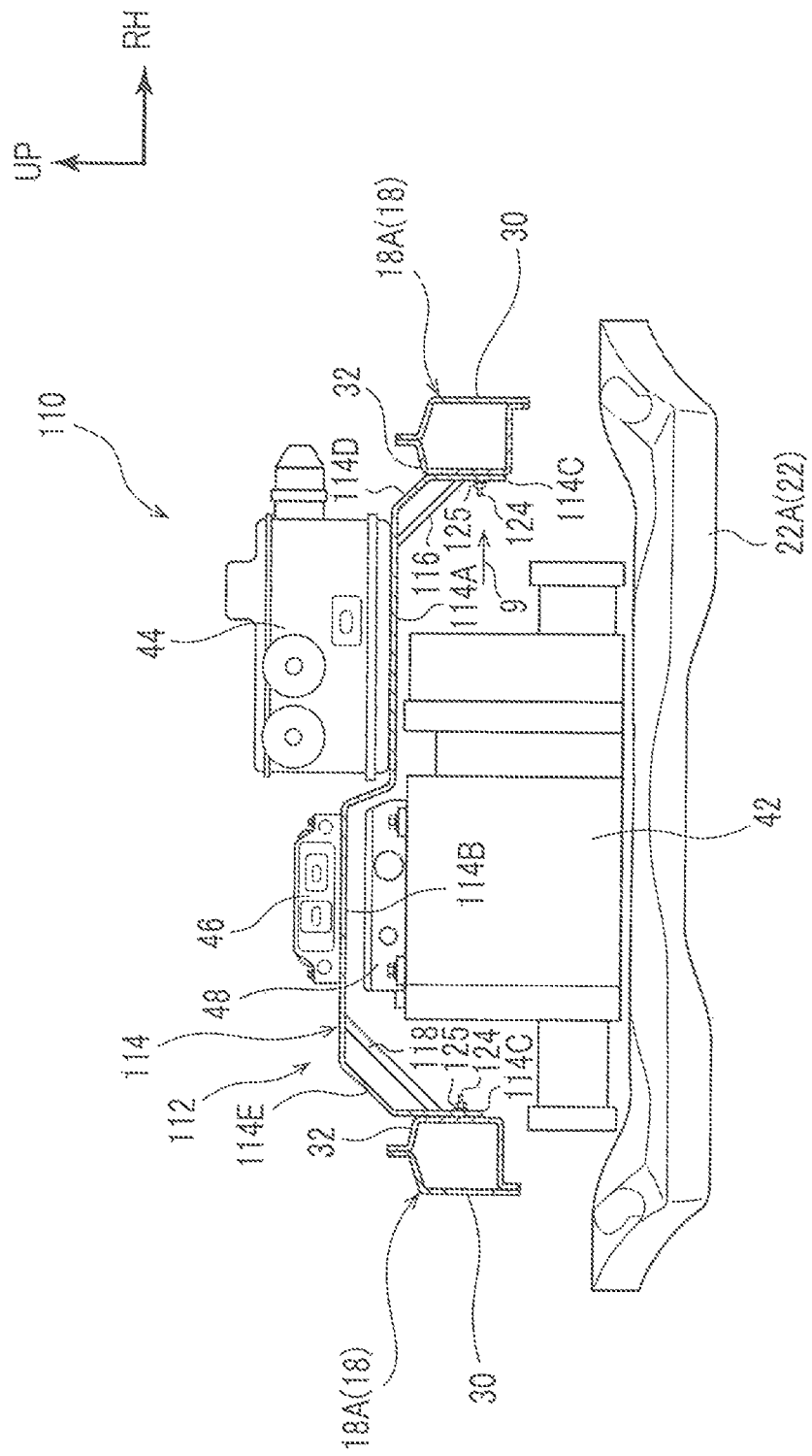
FIG. 8 is rear view showing the configurations of a power unit to which a power unit structure for a vehicle according to a second embodiment is applied and the vehicle body front portion, as viewed from the rear side of the vehicle.

Hereinafter, a second embodiment of the power unit structure for a vehicle will be described using FIGS. 8 and 9. The same constituent portions as those of the first embodiment described above are denoted by the same reference numerals, and description thereof is omitted.

A power unit 110 according to this embodiment basically has the same configuration as the power unit 10 according to the first embodiment. However, the power unit 110 is characterized in that a "mounting part 112" that supports the electric power distribution unit 44 and the water heating heater 46 is mounted to the front side members 18.

Specifically, the mounting part 112 includes a main body portion 114 and reinforcing plate portions 116, 118. The main body portion 114 basically has the same configuration as the main body portion 96 and is configured to include a placing portion 114A on which the electric power distribution unit 44 is placed, a placing portion 114B on which the water heating heater 46 is placed, and a pair of mounting piece portions 114C.

Each of the mounting piece portions 114C has a plate shape extending in the up-down direction of the vehicle and the front-rear direction of the vehicle with a plate thickness direction thereof being in the vehicle width direction of the vehicle. A peripheral edge portion on the upper side of the vehicle of the mounting piece portion 114C on the right side in the vehicle width direction of the vehicle is connected to a peripheral edge portion on the outer side in the vehicle width direction of the vehicle of the placing portion 114A by a connection portion 114D extending from the peripheral edge portion on the upper side of the vehicle of the mounting piece portion 114C toward the inner side in the vehicle width direction of the vehicle and the upper side of the vehicle. On the other hand, a peripheral edge portion on the upper side of the vehicle of the mounting piece portion 114C on the left side in the vehicle width direction of the vehicle is connected to a peripheral edge portion on the outer side in the vehicle width direction of the vehicle of the placing portion 114B by a connection portion 114E extending from the peripheral edge portion on the upper side of the vehicle of the mounting piece portion 114C toward the inner side in the vehicle width direction of the vehicle and the lower side of the vehicle.

The reinforcing plate portion 116 has a plate shape extending so as to be substantially parallel to the connection portion 114D. An end portion on the outer side in the vehicle width direction of the vehicle of the reinforcing plate portion 116 is joined to the surface on the inner side in the vehicle width direction of the vehicle of the mounting piece portion 114C on the right side in the vehicle width direction of the vehicle by a joining portion (not shown) by welding or the like, and an end portion on the inner side in the vehicle width direction of the vehicle of the reinforcing plate portion 116 is joined to the surface on the lower side of the vehicle of the placing portion 114A by a joining portion (not shown) by welding or the like.

On the other hand, the reinforcing plate portion 118 has a plate shape extending so as to be substantially parallel to the connection portion 114E. An end portion on the outer side in the vehicle width direction of the vehicle of the reinforcing plate portion 118 is joined to the surface on the inner side in the vehicle width direction of the vehicle of the mounting piece portion 114C on the left side in the vehicle width direction of the vehicle by a joining portion (not shown) by welding or the like, and an end portion on the inner side in the vehicle width direction of the vehicle of the reinforcing plate portion 118 is joined to the surface on the lower side of the vehicle of the placing portion 114B by a joining portion (not shown) by welding or the like.

Figure 9:
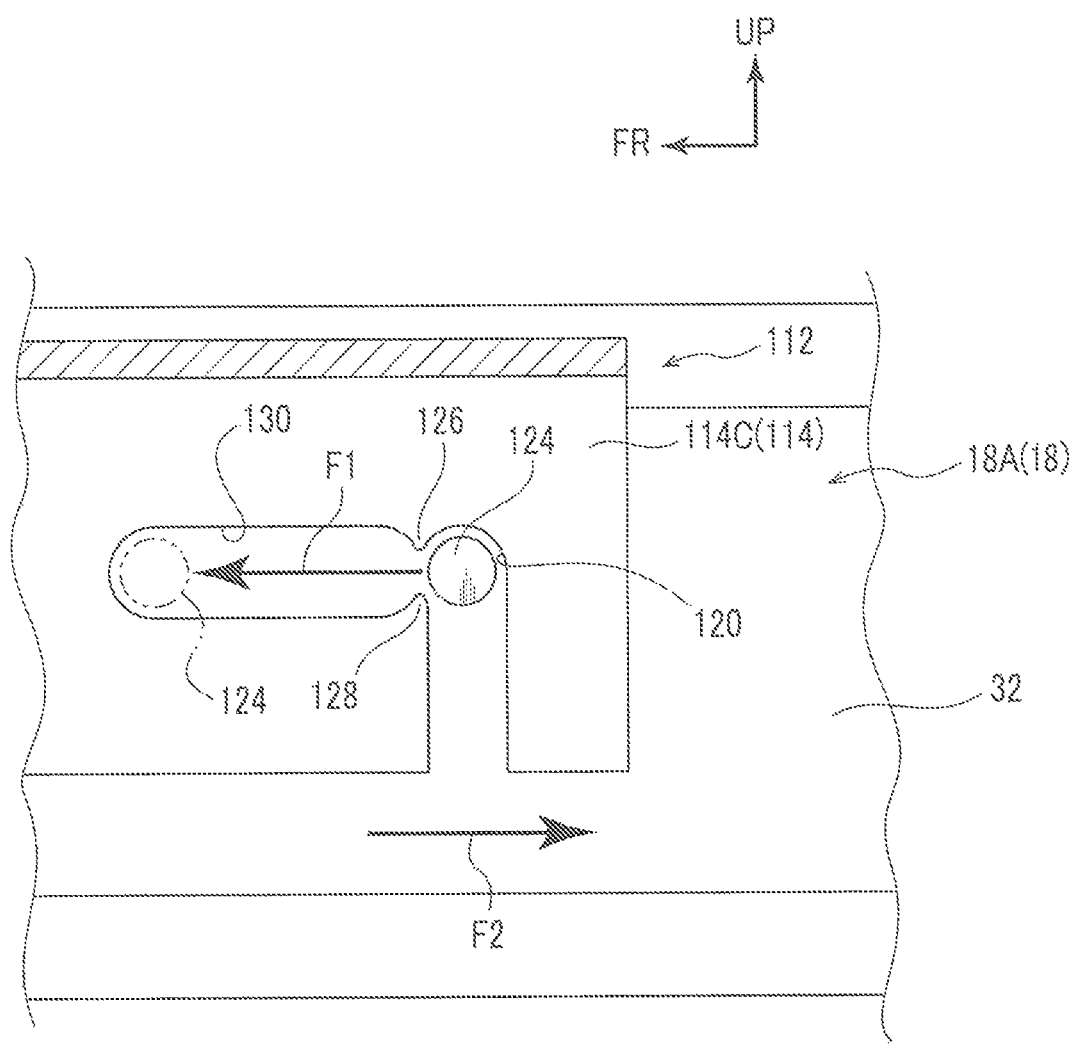
FIG. 9 is a side view (a view as viewed from the direction of an arrow 9 in FIG. 8) showing a connection state between a mount and a front side member of the power unit to which the power unit structure for a vehicle according to the second embodiment is applied, as viewed from the inner side in the vehicle width direction of the vehicle.

Further, as shown in FIG. 9, "insertion portions 120", into each of which a "stud bolt 124" as a shaft part protruding from the front portion 18A of the front side member 18 toward the inner side in the vehicle width direction of the vehicle is inserted in an axial direction of the stud bolt 124, are provided at a plurality of positions spaced apart from each other in the front-rear direction of the vehicle in the mounting piece portion 114C.

The insertion portion 120 has a slit shape that extends from a central portion in the up-down direction of the vehicle of the mounting piece portion 114C to an end portion on the lower side of the vehicle of the mounting piece portion 114C when viewed from the vehicle width direction of the vehicle. Then, a nut 125 is fastened to the stud bolt 124 from the inner side in the vehicle width direction of the vehicle in a state where the stud bolt 124 is inserted into the end portion on the upper side of the vehicle of the insertion portion 120, whereby the mounting part 112 is mounted to the front side member 18.

Here, this embodiment is characterized in that "fuse portions 126, 128" and a slit portion 130 are provided adjacent to the insertion portion 120 in the mounting piece portion 114C.

Specifically, a part on the front side of the vehicle of the insertion portion 120 in a peripheral edge portion thereof is opened at the end portion on the upper side of the vehicle of the insertion portion 120. Then, the slit portion 130 extending in the front-rear direction of the vehicle is provided continuously with the insertion portion 120 on the front side of the vehicle in the end portion on the upper side of the vehicle of the insertion portion 120. The length (width) in the up-down direction of the vehicle of the slit portion 130 is set to a length into which the stud bolt 124 can be inserted.

The fuse portions 126, 128 are provided in a pair in the up-down direction of the vehicle at a boundary portion between the insertion portion 120 and the slit portion 130 and configure a part of the peripheral edge portion of the insertion portion 120. Then, the fuse portion 126 on the upper side of the vehicle has a substantially triangular shape that is reduced in width toward the lower side of the vehicle from the upper side of the vehicle when viewed from the vehicle width direction of the vehicle. On the other hand, the fuse portion 128 on the lower side of the vehicle has a substantially triangular shape that is reduced in width toward the upper side of the vehicle from the lower side of the vehicle when viewed from the vehicle width direction of the vehicle.

Then, when a load F1 toward the front side of the vehicle, which has a magnitude equal to or larger than a predetermined value, acts from the stud bolt 124, the fuse portions 126, 128 are plastically deformed to permit the relative displacement in the front-rear direction of the vehicle between the stud bolt 124 and the insertion portion 120.

According to this embodiment having the above configuration, the same operation and effect as those in the first embodiment described above except for the operation and effect by the configuration in which the mounting part 50 is mounted to the suspension towers 40 are exhibited. Further, in this embodiment, the mounting part 112 is laid in the vehicle width direction of the vehicle between the front side members 18. That is, a state is created where a rigid frame structure is configured by the bumper R/F 20, the front side members 18, and the mounting part 112.

For this reason, when the front side member 18 is crushed and deformed due to a collision load F2 from the front side of the vehicle, the relative displacement in the vehicle width direction of the vehicle between the front side members 18 is suppressed by the mounting part 112. As a result, when the front side member 18 is crushed and deformed, it is possible to axially compress and deform the front side member 18 by suppressing the front side member 18 from being bent and deformed in the vehicle width direction of the vehicle. Therefore, it is possible to secure the shock absorbing performance of the front side member 18 while supporting the electric power distribution unit 44 in a stable state.

Further, in this embodiment, each of the front side members 18 is provided with the stud bolt 124 protruding toward the inner side in the vehicle width direction of the vehicle, and the mounting part 112 to which the electric power distribution unit 44 is mounted is mounted to the stud bolt 124.

Incidentally, it is conceivable that when the front side member 18 is crushed and deformed due to the collision load F2 from the front side of the vehicle, the front side member 18 is not easily crushed and deformed at the mounting place of the mounting part 112 in the front side member 18.

Here, in this embodiment, the insertion portion 120 is provided in the mounting part 112 and the stud bolt 124 provided on the front side member 18 is inserted into the insertion portion 120. Further, the fuse portions 126, 128 are provided adjacent to the insertion portion 120 in the mounting part 112. Then, when the load F1 toward the front side of the vehicle, which is equal to or larger than a predetermined value, acts on the mounting part 112, the fuse portions 126, 128 are plastically deformed under the load from the stud bolt 124, so that the relative displacement in the front-rear direction of the vehicle between the stud bolt 124 and the insertion portion 120 is permitted, and eventually, the relative displacement between the front side member 18 and the mounting part 112 is permitted.

For this reason, when the front side member 18 is crushed and deformed due to the collision load F2 from the front side of the vehicle, even though the crushed deformation reaches the place where the stud bolt 124 is provided, the mounting part 112 is displaced toward the rear side of the vehicle, and thus it is possible to suppress the mounting part 112 from serving as resistance to the crushed deformation. Therefore, it is possible to secure a crushing margin against the collision load F2 from the front side of the vehicle of the front side member 18 while supporting the electric power distribution unit 44 in a stable state.

Further, in this embodiment, the insertion portion 120 is formed in a slit shape extending in the up-down direction of the vehicle. For this reason, when a subassembly configured to include the electric power distribution unit 44, the water heating heater 46, and the mounting part 112 is mounted to the vehicle body 14, it is possible to use the insertion portion 120 and the stud bolt 124 as guides for the subassembly.

Third Embodiment

Figure 10:
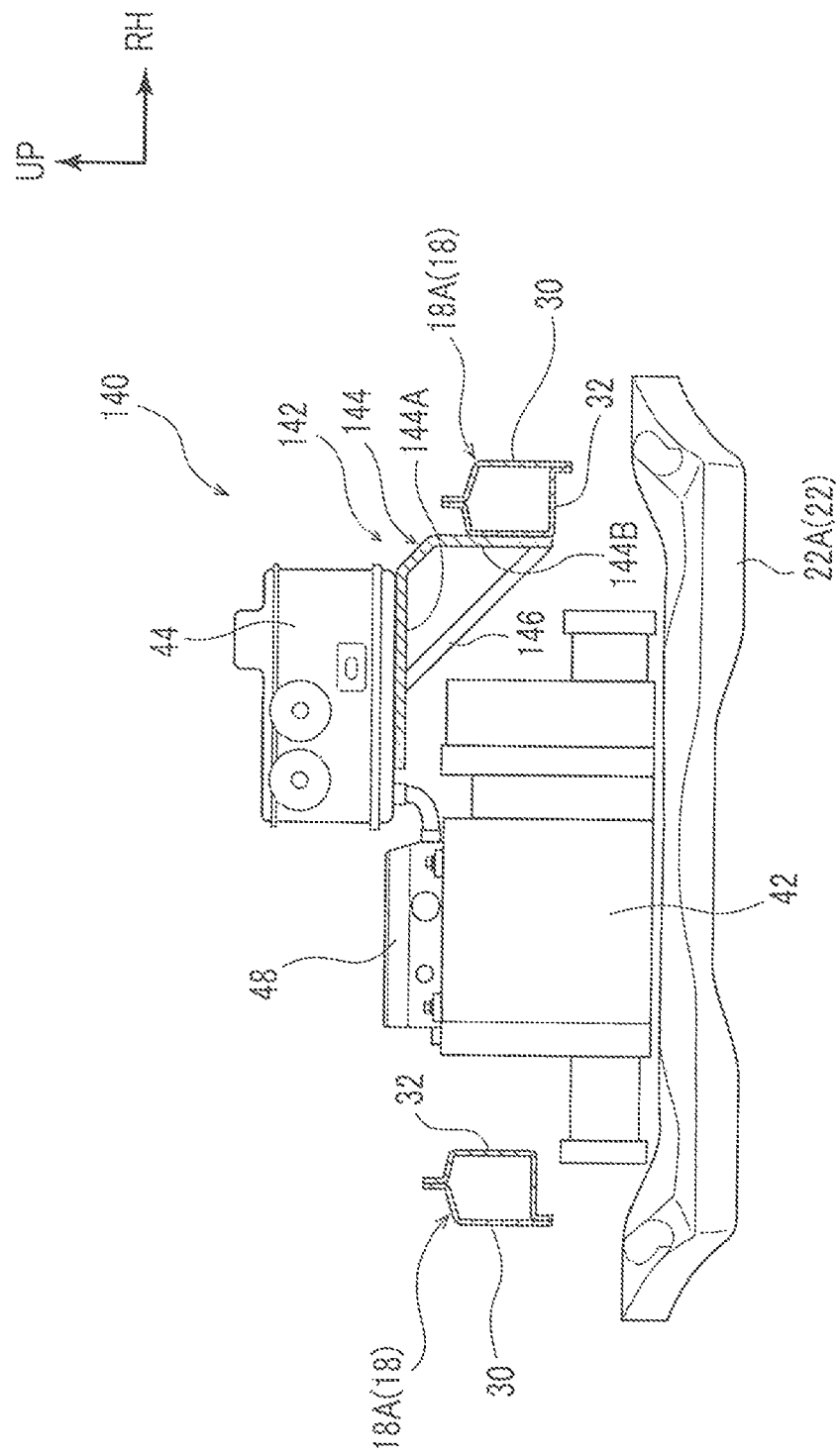
FIG. 10 is rear view showing the configurations of a power unit to which a power unit structure for a vehicle according to a third embodiment is applied and the vehicle body front portion, as viewed from the rear side of the vehicle.

Hereinafter, a third embodiment of the power unit structure for a vehicle will be described using FIG. 10. The same constituent portions as those of the first embodiment described above are denoted by the same reference numerals, and description thereof is omitted.

A power unit 140 according to this embodiment basically has the same configuration as the power unit 10 according to the first embodiment. However, there is a first feature in that the power unit 140 is not provided with the water heating heater 46 according to the specifications of the vehicle 26. Further, there is a second feature in that the electric power distribution unit 44 is mounted in a cantilevered state to the front side member 18 on the right side in the vehicle width direction of the vehicle by a "mounting part 142".

Specifically, the mounting part 142 includes a main body portion 144 and a reinforcing plate portion 146. The main body portion 144 includes a placing portion 144A having the same configuration as the placing portion 96A, and a mounting piece portion 144B.

The mounting piece portion 144B is formed in a plate shape extending in the up-down direction of the vehicle and the front-rear direction of the vehicle with a plate thickness direction thereof being in the vehicle width direction of the vehicle, and is fixed to the front side member 18 by a mounting member (not shown) or a joining portion by welding or the like. As in the second embodiment described above, a configuration is also acceptable in which the insertion portion 120, the slit portion 130, and the fuse portions 126, 128 are provided in the mounting piece portion 144B and the mounting piece portion 144B is mounted to the front side member 18 by using the stud bolt 124 provided on the front side member 18.

On the other hand, the reinforcing plate portion 146 is formed in a plate shape extending from an end portion on the lower side of the vehicle of the mounting piece portion 144B toward a central portion of the placing portion 144A. An end portion on the outer side in the vehicle width direction of the vehicle of the reinforcing plate portion 146 is joined to the surface on the inner side in the vehicle width direction of the vehicle of the mounting piece portion 144B by a joining portion (not shown) by welding or the like, and an end portion on the inner side in the vehicle width direction of the vehicle of the reinforcing plate portion 146 is joined to the surface on the lower side of the vehicle of the placing portion 144A by a joining portion (not shown) by welding or the like.

According to this embodiment having the above configuration, the same operation and effect as those in the first embodiment described above, except for the configuration in which the mounting part 50 is mounted to the suspension towers 40 and the operation and effect by the water heating heater 46, are exhibited. Further, in this embodiment, the configuration inside the power unit room 12 can be simplified according to the specifications of the vehicle 26.

Fourth Embodiment

Figure 11:
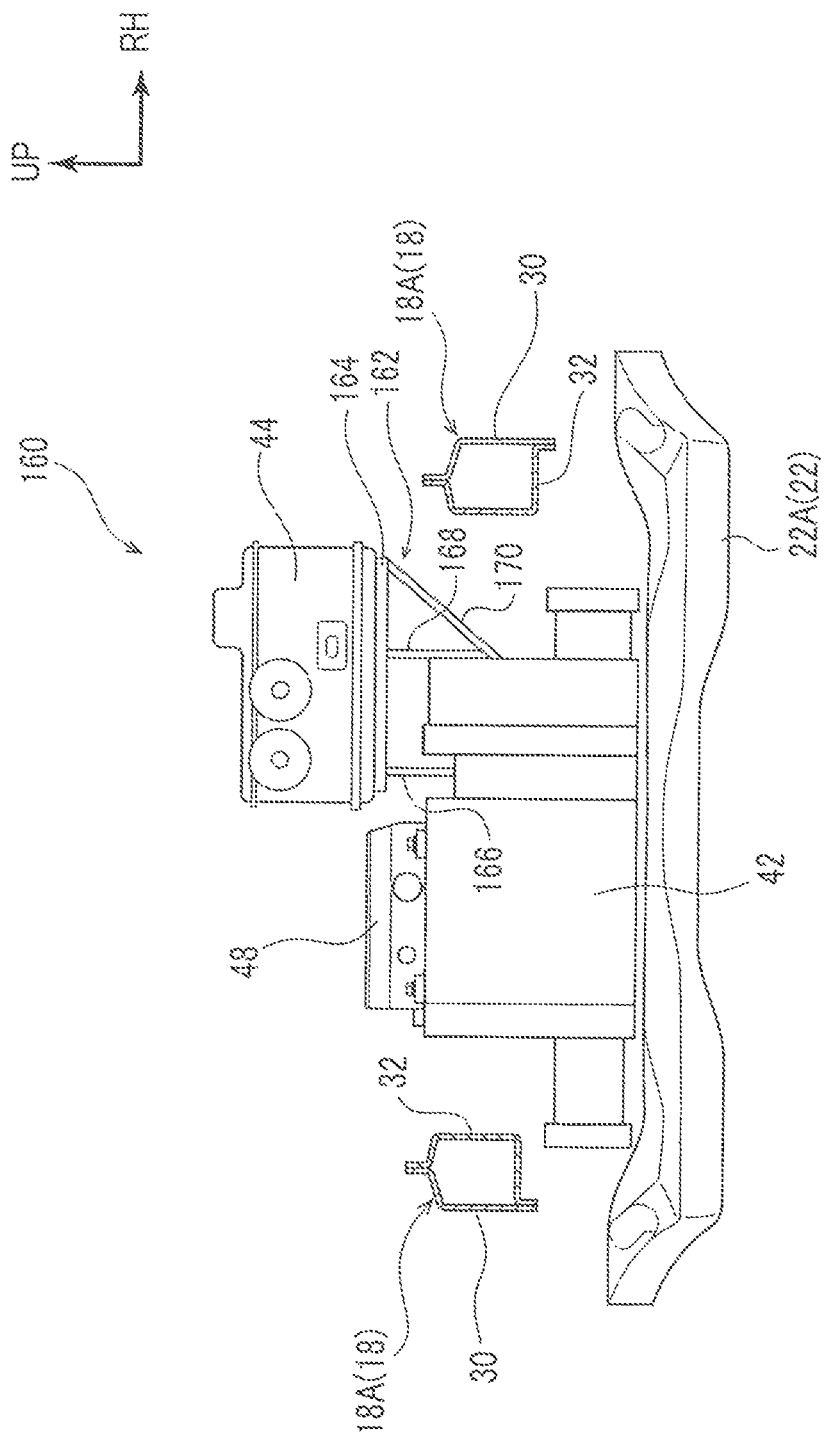
FIG. 11 is rear view showing the configurations of a power unit to which a power unit structure for a vehicle according to a fourth embodiment is applied and the vehicle body front portion, as viewed from the rear side of the vehicle.

Hereinafter, a fourth embodiment of the power unit structure for a vehicle will be described using FIG. 11. The same constituent portions as those of the first embodiment described above are denoted by the same reference numerals, and description thereof is omitted.

A power unit 160 according to this embodiment basically has the same configuration as the power unit 10 according to the first embodiment. However, similar to the third embodiment, there is a first feature in that the power unit 160 is not provided with the water heating heater 46 according to the specifications of the vehicle 26. Further, there is a second feature in that the electric power distribution unit 44 is mounted to the motor 42 through a "mounting part 162".

Specifically, the mounting part 162 is configured to include a placing plate portion 164 having the same configuration as the placing portion 96A, support plate portions 166, 168, and a reinforcing plate portion 170.

The support plate portion 166 is disposed on the lower side of the vehicle of the end portion on the inner side in the vehicle width direction of the vehicle of the placing plate portion 164 and extends in the up-down direction of the vehicle with a plate thickness direction thereof being in the vehicle width direction of the vehicle. An end portion on the upper side of the vehicle of the support plate portion 166 is joined to the placing plate portion 164 by a joining portion (not shown) by welding or the like, and an end portion on the lower side of the vehicle of the support plate portion 166 is mounted to the motor 42 by a mounting member (not shown) or the like.

On the other hand, the support plate portion 168 is disposed on the lower side of the vehicle of a central portion of the placing plate portion 164, and extends in the up-down direction of the vehicle with a plate thickness direction thereof being in the vehicle width direction of the vehicle. An end portion on the upper side of the vehicle of the support plate portion 168 is joined to the placing plate portion 164 by a joining portion (not shown) by welding or the like, and an end portion on the lower side of the vehicle of the support plate portion 168 is mounted to the motor 42 by a mounting member (not shown) or the like.

Then, the reinforcing plate portion 170 extends from an end portion on the lower side of the vehicle of the support plate portion 168 to an end portion on the outer side in the vehicle width direction of the vehicle of the placing plate portion 164 and is joined to the support plate portion 168 and the placing plate portion 164 by a joining portion (not shown) by welding or the like.

According to this embodiment having the above configuration, the same operation and effect as those in the first embodiment described above, except for the configuration in which the mounting part 50 is mounted to the suspension towers 40 and the operation and effect by the water heating heater 46, are exhibited. Further, in this embodiment, similar to the third embodiment described above, the configuration inside the power unit room 12 can be simplified according to the specifications of the vehicle 26. Further, in this embodiment, the motor 42, the inverter 48, and the electric power distribution unit 44 are made into a sub-assembly, whereby it is possible to reduce the number of processes when disposing these in the power unit room 12.

Supplementary Description of Above Embodiments (1) In the embodiments described above, the charging port 64 is disposed on the right side in the vehicle width direction of the vehicle 26. However, the charging port 64 may be disposed on the left side in the vehicle width direction of the vehicle 26 according to the specifications or the like of the vehicle 26. Further, in a case where the charging port 64 is disposed on the left side in the vehicle width direction of the vehicle, the electric power distribution unit 44 may be disposed on the upper side of the vehicle of the inverter 48.

(2) Further, in the embodiments described above, the electric power distribution unit 44 is disposed at a position overlapping the inverter 48 when viewed from the vehicle width direction of the vehicle. However, there is no limitation thereto. That is, the electric power distribution unit 44 may be disposed at a position overlapping the inverter 48 when viewed from the front-rear direction of the vehicle, according to the specifications or the like of the vehicle 26. Further, in a case where a reduction in the size of the motor 42 is possible according to the specifications or the like of the vehicle 26, a configuration may be adopted in which the motor 42 and the electric power distribution unit 44 are disposed so as not to overlap each other when viewed from the up-down direction of the vehicle.

(3) In addition, in the embodiments described above, the power unit is disposed in the vehicle body front portion 16. However, there is no limitation thereto. For example, a configuration may be made in which the motor 84 and the inverter 78 are supported by a suspension member configuring a part of a vehicle body rear portion according to the specifications or the like of the vehicle 26 and the electric power distribution unit 44, the water heating heater 46, and the mounting part 50 are supported by a suspension tower configuring a part of the vehicle body rear portion.

What is claimed is:

1. A power unit structure for a vehicle, the power unit structure comprising:
    a motor disposed in a power unit room of the vehicle and configured to transmit a driving force to drive wheels of the vehicle;
    an electric power converter disposed in the power unit room of the vehicle, the electric power converter being configured to convert supplied electric power into electric power to be supplied to the motor and being disposed on an upper side of the motor; and
    an electric power distributor having a high voltage junction box, the electric power distributor being disposed in the power unit room of the vehicle, the electric power distributor being configured to distribute electric power supplied from a power supply to the electric power converter and being disposed at a position where at least a part of the electric power distributor overlaps the electric power converter in an up-down direction of the vehicle when viewed from a front-rear direction of the vehicle or a vehicle width direction of the vehicle, wherein
    the electric power distributor is mounted on a mounting part provided on a vehicle body constituent member of the vehicle,
    the vehicle body constituent member configures a part of a side portion in the vehicle width direction of the vehicle,
    the vehicle body constituent member is a pair of front side members of the vehicle,
    the mounting part is laid in the vehicle width direction of the vehicle between the front side members,
    each of the front side members includes a shaft part that protrudes to an inner side in the vehicle width direction of the vehicle and is used for mounting of the mounting part, and
    the mounting part includes an insertion portion configured such that the shaft part is inserted into the insertion portion in an axial direction of the shaft part, and a fuse portion that is provided adjacent to the insertion portion and permits relative displacement in the front-rear direction of the vehicle between the shaft part and the insertion portion by being plastically deformed when a load having a magnitude equal to or larger than a predetermined value, toward a front side of the vehicle, acts on the mounting part.

2. The power unit structure according to claim 1, wherein the electric power distributor is disposed at a position where at least a part of the electric power distributor overlaps the electric power converter when viewed from the vehicle width direction of the vehicle.

3. The power unit structure according to claim 1, wherein:
a connection portion for charging, to which electric power is supplied from an external power supply as the power supply, is disposed at a fender portion configuring a part on a design surface side of a side portion in the vehicle width direction of the vehicle; and
the electric power distributor is disposed at a position closer to the connection portion than the electric power converter and the connection portion and the electric power distributor are connected to each other by a wire harness.

4. The power unit structure according to claim 1, wherein the electric power converter is fixed to the motor.

5. The power unit structure according to claim 4, wherein:
the motor includes a motor side connector that is disposed on the upper side of the motor; and
the electric power converter includes an electric power converter side connector that is disposed on a lower side of the electric power converter and configured to be electrically connected to the motor side connector.

6. The power unit structure according to claim 1, wherein the electric power converter and the electric power distributor are electrically connected to each other by a power unit side wire harness.

7. The power unit structure according to claim 1, further comprising a water heating heater disposed on the upper side of the electric power converter, wherein:
the water heating heater is configured to receive electric power that is supplied from the electric power distributor; and
the water heating heater is disposed at a position overlapping the electric power distributor when viewed from the vehicle width direction of the vehicle.

* * * * *